United States Patent
Montemurro et al.

(10) Patent No.: US 12,069,174 B2
(45) Date of Patent: Aug. 20, 2024

(54) SECURE COMMUNICATION WITH AN AUTHENTICATION PROCESS

(71) Applicant: MALIKIE INNOVATIONS LIMITED, Dublin (IE)

(72) Inventors: Michael Peter Montemurro, Toronto (CA); Daniel Richard L. Brown, Mississauga (CA)

(73) Assignee: Malikie Innovations Limited, Dublin (IE)

( * ) Notice: Subject to any disclaimer, the term of this patent is extended or adjusted under 35 U.S.C. 154(b) by 342 days.

(21) Appl. No.: 16/271,442

(22) Filed: Feb. 8, 2019

(65) Prior Publication Data

US 2020/0259650 A1 Aug. 13, 2020

(51) Int. Cl.
| | |
|---|---|
| *H04L 9/32* | (2006.01) |
| *G06Q 10/0833* | (2023.01) |
| *H04L 9/06* | (2006.01) |
| *H04L 9/08* | (2006.01) |
| *H04W 12/041* | (2021.01) |

(Continued)

(52) U.S. Cl.
CPC ......... *H04L 9/321* (2013.01); *G06Q 10/0833* (2013.01); *H04L 9/0631* (2013.01); *H04L 9/0822* (2013.01); *H04L 9/0825* (2013.01); *H04L 9/3263* (2013.01); *H04W 12/041* (2021.01); *H04W 12/0431* (2021.01); *H04W 12/069* (2021.01)

(58) Field of Classification Search
CPC ..... H04L 9/321; H04L 9/0631; H04L 9/0822; H04L 9/0825; H04L 9/3263; H04L 9/3273; H04L 9/0637; H04L 9/3066; H04L 2209/805; H04L 9/0844; H04W 12/041; H04W 12/069; H04W 12/0431; G06Q 10/0833
See application file for complete search history.

(56) References Cited

U.S. PATENT DOCUMENTS

| | | | |
|---|---|---|---|
| 7,482,920 B2 * | 1/2009 | Joao ................. | G06Q 10/08 340/568.1 |
| 8,026,792 B2 * | 9/2011 | Powers .............. | E05B 51/02 70/56 |

(Continued)

OTHER PUBLICATIONS

"Lesjak et al., Hardware-Secured and Transparent Multi-Stakeholder Data Exchange for Industrial IoT, 2016, IEEE, pp. 706-713" (Year: 2016).*

(Continued)

*Primary Examiner* — Oleg Korsak
(74) *Attorney, Agent, or Firm* — Botos Churchill IP Law LLP

(57) ABSTRACT

Systems, methods, and software can be used to improve security of an authentication process in a cargo shipping system. In some aspect, an authentication request message is received at a sensor from a cargo tracking device. The authentication request message includes a key that the sensor will use to decrypt its encrypted public key/private key pair. In response to the authentication request message, the sensor sends an authentication response message to the cargo tracking device that is encrypted using a derived symmetric key. The cargo tracking device sends an authentication confirmation message to the sensor in response to the authentication response message.

23 Claims, 6 Drawing Sheets

(51) Int. Cl.
*H04W 12/0431* (2021.01)
*H04W 12/069* (2021.01)

(56) References Cited

U.S. PATENT DOCUMENTS

| | | | | |
|---|---|---|---|---|
| 8,347,094 | B2* | 1/2013 | Singh | H04L 63/123 |
| | | | | 713/169 |
| 8,862,393 | B2* | 10/2014 | Zhou | G08C 17/02 |
| | | | | 340/506 |
| 10,097,353 | B1* | 10/2018 | Carlson | H04W 4/021 |
| 10,389,702 | B2* | 8/2019 | Hu | H04L 63/068 |
| 11,568,353 | B2* | 1/2023 | Davis | G06Q 10/0833 |
| 2004/0100379 | A1* | 5/2004 | Boman | G06Q 10/06 |
| | | | | 340/539.26 |
| 2006/0247986 | A1* | 11/2006 | Joao | G06Q 10/087 |
| | | | | 705/28 |
| 2007/0299624 | A1* | 12/2007 | Motobayashi | H04L 63/0428 |
| | | | | 702/117 |
| 2008/0186166 | A1* | 8/2008 | Zhou | G01S 19/17 |
| | | | | 340/539.13 |
| 2008/0292105 | A1* | 11/2008 | Wan | H04L 9/0825 |
| | | | | 380/282 |
| 2009/0063863 | A1* | 3/2009 | Durand | H04L 9/0844 |
| | | | | 713/171 |
| 2009/0268911 | A1* | 10/2009 | Singh | H04L 9/0844 |
| | | | | 380/270 |
| 2010/0001840 | A1* | 1/2010 | Kang | H04Q 9/00 |
| | | | | 340/10.1 |
| 2010/0017617 | A1* | 1/2010 | Lee | H04L 9/0869 |
| | | | | 713/185 |
| 2010/0328031 | A1* | 12/2010 | Powers | G08B 25/10 |
| | | | | 340/5.64 |
| 2010/0332359 | A1* | 12/2010 | Powers | G07C 9/00896 |
| | | | | 705/28 |
| 2011/0022851 | A1* | 1/2011 | Yokota | H04L 9/0894 |
| | | | | 713/189 |
| 2011/0268274 | A1* | 11/2011 | Qiu | H04L 9/0844 |
| | | | | 380/270 |
| 2011/0291803 | A1* | 12/2011 | Bajic | G08B 13/2462 |
| | | | | 340/10.1 |
| 2012/0068817 | A1* | 3/2012 | Fisher | G07C 9/00896 |
| | | | | 340/5.61 |
| 2012/0221858 | A1* | 8/2012 | Struik | H04L 9/0844 |
| | | | | 713/171 |
| 2012/0319823 | A1* | 12/2012 | Butler | G06K 19/0724 |
| | | | | 340/10.1 |
| 2013/0117745 | A1* | 5/2013 | Kamiyama | G06F 21/10 |
| | | | | 718/1 |
| 2014/0301551 | A1* | 10/2014 | Adler | H04L 9/3066 |
| | | | | 380/270 |
| 2014/0357187 | A1* | 12/2014 | Ehrensvard | H04B 5/0031 |
| | | | | 455/41.1 |
| 2015/0002260 | A1* | 1/2015 | Brown | G06F 21/44 |
| | | | | 340/5.8 |
| 2015/0052352 | A1* | 2/2015 | Dolev | H04L 9/3278 |
| | | | | 713/156 |
| 2016/0092834 | A1* | 3/2016 | McCulloch | G06Q 10/08 |
| | | | | 705/28 |
| 2016/0099814 | A1* | 4/2016 | Negi | H04L 9/3268 |
| | | | | 713/171 |
| 2016/0195602 | A1* | 7/2016 | Meadow | G06F 21/6218 |
| | | | | 701/517 |
| 2016/0241389 | A1* | 8/2016 | Le Saint | H04L 9/14 |
| 2017/0180314 | A1* | 6/2017 | Walker | H04L 63/0492 |
| 2018/0020353 | A1* | 1/2018 | Bhandaru | H04L 9/088 |
| 2018/0088206 | A1* | 3/2018 | Meadow | G01S 5/14 |
| 2018/0232693 | A1* | 8/2018 | Gillen | G06Q 10/0833 |
| 2018/0365636 | A1* | 12/2018 | Lucrecio | G06Q 50/30 |
| 2019/0044708 | A1* | 2/2019 | Dewan | H04L 9/0897 |
| 2019/0089532 | A1* | 3/2019 | Lambert | H04L 9/3273 |
| 2019/0372764 | A1* | 12/2019 | Fay | H04L 9/0844 |
| 2020/0051015 | A1* | 2/2020 | Davis | G06K 19/0723 |

OTHER PUBLICATIONS

"Dworkin, M., Recommendation for Block Cipher Modes of Operation: Galois/Counter Mode (GMC) and GMAC, 2007, NIST, pp. 1-31" (Year: 2007).*

Anggorojati et al., "Elliptic curve cryptography based key management for the M2M local cloud platform." 2016 International conference on advanced computer science and information systems (ICACSIS). IEEE, Oct. 15, 2016, 6 pages.

Extended European Search Report issued in European Application No. 20151860.2 on May 28, 2020, 8 pages.

Lesjak et al., "Hardware-secured and transparent multi-stakeholder data exchange for industrial IoT." 2016 IEEE 14th International Conference on Industrial Informatics (INDIN), IEEE, Jul. 19, 2016, 8 pages.

Accredited Standards Committee, "Public Key Cryptography for the Financial Services Industry: Key Agreement and Key Transport Using Elliptic Curve Cryptography," American National Standard for Financial Services (X9.63-2011), Dec. 2011, 159 pages.

Barker et al., "Recommendation for Pair-Wise Key-Establishment Schemes Using Discrete Logarithm Cryptography," NIST Special Publication 800-56A, Rev. 3, Apr. 2018, 152 pages.

Brown, "SEC 1: Elliptic Curve Cryptography," Standards for Efficient Cryptography, Ver. 2.0, May 2009, 144 pages.

Brown, "SEC 2: Recommended Elliptic Curve Domain Parameters," Standards for Efficient Cryptography, Ver. 2.0, Jan. 2010, 37 pages.

Dworkin, "Recommendation for Block Cipher Modes of Operation: Galois/Counter Mode (GCM) and GMAC," NIST Special Publication 800-38D, Computer Security, Nov. 2007, 39 pages.

Federal Information Processing Standards (FIPS) 180-4, "Secure Hash Standard (SHS)," National Institute of Standards and Technology, US Department of Commerce, Mar. 2012, 36 pages.

Federal Information Processing Standards (FIPS) 186-4, "Digital Signature Standard," National Institute of Standards and Technology, US Department of Commerce, Jul. 2013, 130 pages.

Harkins, "Synthetic Initialization Vector (SIV) Authenticated Encryption Using the Advanced Encryption Standard (AES)," No. RFC 5297, Network Working GroupOct. 2008, 26 pages.

IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), Mar. 2016, 3,534 pages.

IEEE Computer Society, "IEEE Standard Specification for Public-Key Cryptography—Amendment 1: Additional Techniques" (IEEE Std. 1363a-2004), Jul. 2004, 168 pages.

ITU.int [online], "X.509: Information Technology—Open Systems Interconnection—the Directory: Public-key and Attribute Certificate Frameworks," International Telecommunication Union Publications: X-Series, last updated Jun. 8, 2018, [retrieved on Apr. 26, 2019], retrieved from: URL<https://www.itu.int/rec/T-REC-X.509/en>, 2 pages.

ITU-T, "Technical Corrigendum 3," X509 Corrigendum 3 (Oct. 2012), Series X: Data Networks, Open System Communications and Security, Oct. 2012, 8 pages.

Krawczyk et al., "HMAC-based Extract-and-Expand Key Derivation Function (HKDF)," No. RFC 5869, Internet Engineering Taskforce (IETF), May 2010, 14 pages.

McGrew et al.,, "Fundamental Elliptic Curve Cryptography Algorithms," No. RFC 6090, Internet Engineering Taskforce (IETF), Feb. 2011, 34 pages.

Salowey et al., "AES Galois Counter Mode (GCM) Cipher Suites for TLS", RFC 5288, Network Working Group, Aug. 2008, 8 pages.

* cited by examiner

SECURE COMMUNICATION WITH AN AUTHENTICATION PROCESS

TECHNICAL FIELD

The present disclosure relates to enhancing communications security using an improved authentication process.

BACKGROUND

In a cargo shipping operation, a cargo shipping system can include one or more cargo transportation unit (CTU). The CTU can be a trailer, chassis, or a shipping container. A cargo load can be loaded onto the CTU to be delivered to a destination.

DESCRIPTION OF DRAWINGS

Like reference numbers and designations in the various drawings indicate like elements.

DETAILED DESCRIPTION

In some implementations, a cargo shipping system can include one or more cargo transportation unit (CTU). The cargo shipping system can also include one or more cargo tracking devices. Each of the cargo tracking device can be installed on a respective CTU. The cargo tracking device can obtain information of the load status, the door status, and the location status of the CTU and send obtained information to a cargo processing server. The cargo shipping system can also include one or more sensors that detects events and changes in its environments. The sensors can be paired with the cargo tracking device at installation time.

In some cases, the pairing process between the sensors and the cargo tracking device can be automated to reduce user interaction during the installation process of the sensors and cargo tracking device. This approach can reduce the installation complexity and improve user experience. During the automated process, the cargo tracking device and the sensors can discover each other and pair with each other. Furthermore, a secure communication can be established between the cargo tracking device and the sensors to improve the security. In some implementations, the secure communication can be established without a communication between the sensors and the cargo processing server during the pairing process.

In some implementations, the sensor is provisioned with an identifier and a public key/private key pair of the sensor during manufacturing. The public and private keys are concatenated, encrypted, and stored on the sensor. The cargo tracking device is provisioned with a public key/private key pair of the cargo tracking device at manufacturing. The key pair is stored in memory of the cargo tracking device. When a customer purchases a sensor and a cargo tracking device, the cargo processing server is provisioned with the identifier and the public key of the sensor. The cargo tracking device discovers the sensor using the identifier. After the cargo tracking device discovers the sensor, the cargo tracking device transmits an encryption key to the sensor. The sensor uses the encryption key to decrypt its encrypted public key/private key pair. The cargo tracking device and sensor can authenticate and derive a symmetric key based on their public/private keys. The symmetric key can be used for any associated data transmissions between the cargo tracking device and sensor. By storing an encrypted public/private key pair on the sensor without storing the encryption key that is used to decrypt the public/private key pair on the sensor, this approach can prevent a malicious attacker from obtaining the public/private key pair of the sensor and establishing an insecure communication with the cargo tracking device, thereby improving the security of the cargo shipping system. FIGS. 1-7 and associated descriptions provide additional details of these implementations.

Figure 1:
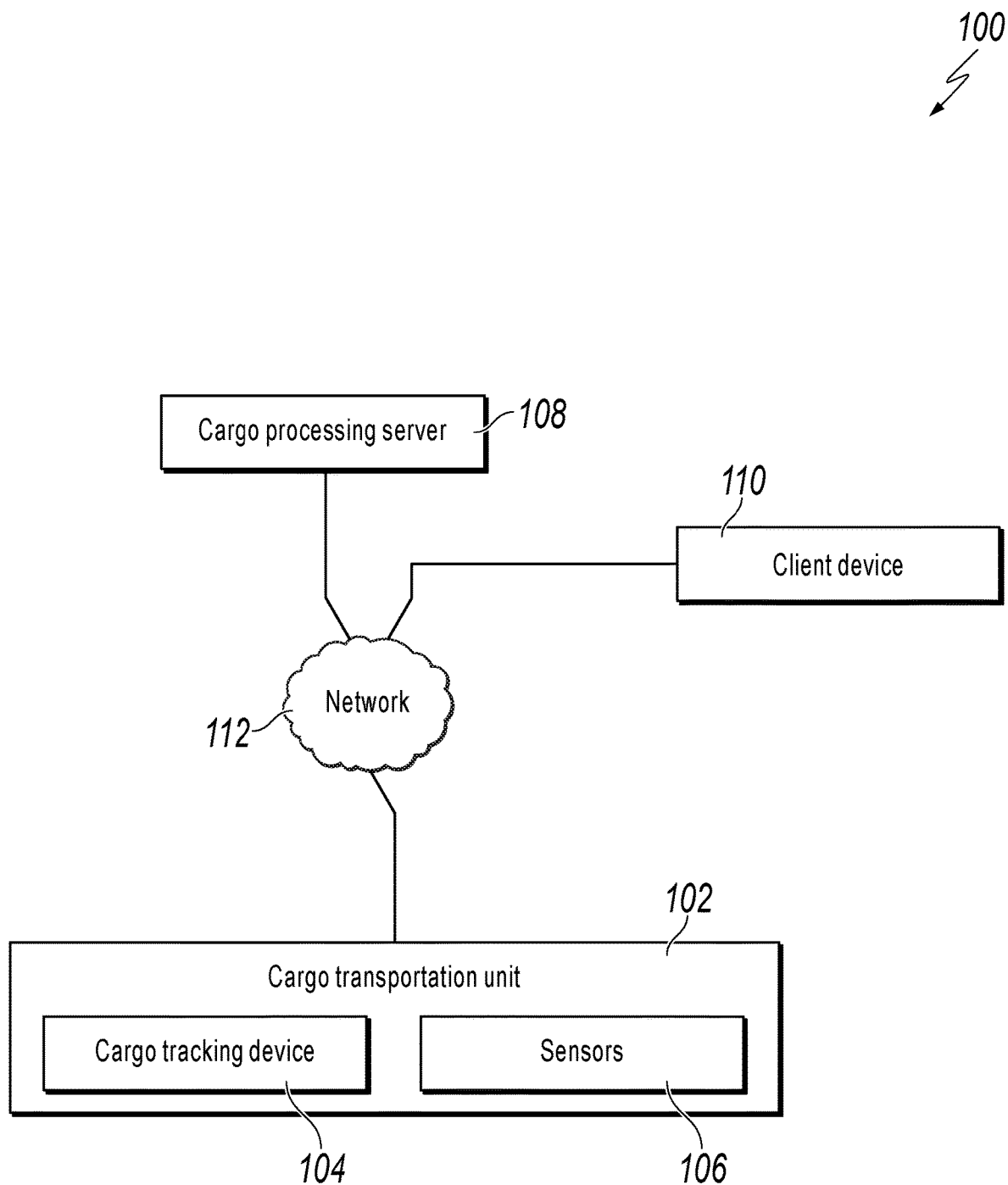
FIG. 1 is an example cargo shipping system according to an implementation.

FIG. 1 is an example cargo shipping system 100 according to an implementation. At a high level, the example cargo shipping system 100 includes a CTU 102 that is coupled with a cargo tracking device 104 and one or more sensors 106. The system 100 also includes a cargo processing server 108, and a driver client device 110 that are communicably coupled with the CTU 102 over a network 112.

The CTU 102 can be an unpowered vehicle, a freight container, or any other reusable transport unit that can be used to transport cargo loads between different locations. For example, the CTU 102 can be a trailer with one or more front axles, one or more rear axles, or any combinations thereof. The CTU 102 can include a drawbar that can be used to pull to CTU 102 by a truck. The CTU 102 can also be a freight container built with steel boxes, corrugated boxes, or a combination thereof. In some cases, the example cargo shipping system 100 can include multiple CTUs 102. The multiple CTUs 102 can have different configurations, e.g., size or cargo weight limit. The multiple CTUs 102 can also be configured to carry different types of cargo loads, e.g., fragile goods, explosive goods, refrigerated goods, or livestock. In some cases, the CTU 102 can be chained with one or more other CTUs. The chained CTUs can be pulled by the same tractor. In these or other cases, each of the one or more other CTUs can also be coupled with a respective cargo tracking device. In some implementations, the CTU 102 and a tractor that pulls the CTU can be combined in one integrated and non-separable unit, e.g., a lorry.

The cargo tracking device 104 represents an application, software, software modules, hardware, or any combinations thereof that can be configured to provide status notifications of the CTU 102. The status notification includes a load status, a door status, a location status, or any combinations thereof.

In some cases, the cargo tracking device 104 can include a number of status components that are communicatively coupled to one or more sensors 106. For example, the cargo tracking device 104 can include a load status component that determines the load status of the CTU 102. The load status can indicate whether the CTU 102 is full, empty, or partially full. The load status can also indicate a percentage of occupancy. In some cases, the load status component can be communicatively coupled to a scanning sensor 106 that scans the interior of the CTU 102. In some cases, the scanning sensor 106 can generate scanned image based on light refraction. Alternatively or in combination, the scanning sensor 106 can generate a scanned image using camera, video recorder, or any other imagery components or ultrasonic/radio/radar waves using non-visible spectrum and/or energy pulses and reflection and refraction measurements. The scanned image can be analyzed by the load status component to determine the load status of the CTU 102. For example, the scanned image can be analyzed to determine the remaining volume of the CTU 102 for additional load. The remaining volume can be indicated using length units, e.g., feet or meters left in the CTU 102 for additional load, area units, e.g., square footage left in the CTU 102 for additional load, or volume units, e.g., cubic feet or meters left in the CTU 102 for additional load.

Alternatively or in combination, the load status component can be communicatively coupled to a weighting sensor 106 that detects the current weight of the CTU 102. The weighting sensor 106 may also be calibrated to ignore a portion of load, for example load close to the floor which may be refuse or garbage from prior deliveries. The weighting sensor 106 may also be calibrated for certain styles of loading including front to back, side to side, or other variations. Each approach has unique properties when viewed as a scanned image. The current weight of the CTU 102 can be used to compare with the empty weight and the fully loaded weight of the CTU 102 to determine the load status of the CTU 102. In some cases, the fully loaded weight can be set accordingly to a legal weight limit of the CTU 102. Therefore, a CTU 102 that is partially empty can still be 100% loaded if the current weight matches the weight limit of the CTU 102 as stored in the system 100. In some cases, the cargo tracking device 104 can analyze the load data collected by the sensors 106 and transmit the analyzed result, e.g., in percentage or in absolute value, to the cargo processing server 108. Alternatively or in combination, the cargo tracking device 104 can transmit the load status information detected by the sensors 106, e.g., the scanned image or the detected weight, to the cargo processing server 108 for processing and analysis.

The cargo tracking device 104 can include a door status component that determines a door status or door event of the CTU 102. The door status can indicate whether the door of the CTU 102 is open or closed and the door event can indicate if the door was opened or closed. In one implementation, the cargo tracking device 104 can be installed on the rear door of the CTU 102. The cargo tracking device 104 can be communicatively coupled to a gyroscope or an accelerometer that can be used to detect the motion of the rear door. In addition, other sensors 106 such as a camera, time of flight sensor, or radar may be used to confirm or augment door status information. The door status component can analyze the data collected by these sensors 106, remove effects that may cause false positives such as those caused by vibration movement, changes in ambient light, and variability within containers such as size, paint colors and materials which may have different reflectivity, and detect a door open event and a door close event. Alternatively or in combination, the door status component can use ambient light, radar, door seals, door magnets, vibration detector, or any other components to detect the movement and status of the door on the CTU 102.

The cargo tracking device 104 can include a location component that determines a location status of the CTU 102. The location component can be communicatively coupled to a global positioning system (GPS) unit or sensor 106 that receives GPS signals. In some cases, the location components can calculate the location of the CTU 102 based on the received GPS signals. In some cases, the location component can determine one or more location parameters based on the received GPS signals. The location parameters can be used by the cargo processing server 142, or any other location determination units, to determine the location of the CTU 102. In some cases, the cargo tracking device 104 can use additional location information based on signals transmitted by a cellular network or a wireless local area network (WLAN) to determine the location of the CTU 102, or send the additional location information to the cargo processing server 108, or any other location determination units, to determine the location of the CTU 102. In some cases, locations can be determined by using geo-fencing software or algorithms. In some cases, the location information can be used to determine the distances that the CTU 102 has traveled. Alternatively or in combination, the location information can be used to determine whether the CTU 102 travels on the correct delivery route.

The status notification can also include motion status of the CTU 102, humidity, altitude, or temperature of the CTU 102. For example, the cargo tracking device 104 can be communicatively coupled to a gyroscope, an accelerometer, or a combination thereof that can be used to determine the angular and linear motions of the CTU 102. The cargo tracking device 104 can be communicatively coupled to an accelerometer that can be used to determine the acceleration of the CTU 102. The motion information can be used to determine location, speed, travel distance, or any combinations thereof of the CTU 102. The cargo tracking device 104 can also be communicatively coupled to a thermostat, a humidistat, or a combination thereof that can be used to determine the humidity or temperature inside or outside of the CTU 102.

As referred to herein, the CTU 102 may include a cargo tracking device 104 that is affixed to the CTU 102, or is removable from the CTU 102.

The cargo tracking device 104 can also include a wireless communication subsystem that can be configured to send or receive data over the network 112. The wireless communication subsystem can include, for example, one or more antennas, a receiver, a transmitter, a local oscillator, a mixer, and a digital signal processing (DSP) unit. In some implementations, the subsystem can support multiple-input multiple-output (MIMO) transmissions. The wireless communication subsystem can include an application, set of applications, software, software modules, hardware, or any combinations thereof that can be configured to transmit or receive data over a wide area network or local area network using one or more radio access technologies, e.g., wireless local area network (WLAN), Low Power Wide Area Network (LPWAN), Internet of Things (IoT) network, Sigfox network, Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, or the fifth generation (5G) communication network.

The sensors 106 detect event or changes in its environment and send the information to other components of system 100, for example such as, cargo tracking device 104. In some cases, the sensors 106 can include a scanning sensor that scans the interior of the CTU 102, a weighting sensor that detects the current weight of the CTU 102, a motion sensor that detects the motion of the doors of the CTU 102, a location sensor that receives GPS signals of the CTU 102, a humidity sensor (e.g., a humidistat), an altitude sensor, a temperature sensor (e.g., a thermostat), a gyroscope, an accelerometer, a camera or any combinations thereof.

The cargo processing server 108 represents an application, set of applications, software, software modules, hardware, or any combinations thereof that can be configured to process CTU status notifications and generate delivery requests. In some cases, the cargo processing server 108 can send a shipping order for a CTU 102 to pick up a load, receive CTU status notification and driver availability information, select driver, send delivery requests, and determine delivery route. FIGS. 2-7 and associated descriptions provide additional details of the cargo processing server.

The client device 110 represents an application, set of applications, software, software modules, hardware, or any combinations thereof that can be configured to transmit to and receive information from the CTU 102, transmit to and receive information from the cargo processing server 108, or any combination thereof. In some cases, the client device 110 can include a mobile device having a client application. The client application can provide a user interface for a driver, dispatcher, a docket person, or a combination thereof to communicate with the CTU 102, the cargo processing server 108 or any other entities in the cargo shipping system 100. In some implementations, the driver, dispatcher or the docket person can also use the client device 110 to register the sensors 106 in the cargo processing server 108, pair the sensors 106 with the cargo tracking device 104, request a CTU to pick up a load, request a delivery, confirm or reject a driver, receive a confirmation that a CTU is en route, receive a delivery confirmation and payment information, or any combinations thereof.

The network 112 includes a wireless network, a wireline network, or a combination thereof. For example, the network 112 can include one or a plurality of radio access networks (RANS), core networks (CNS), and external networks. The RANS may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), or LTE-Advanced. In some instances, the core networks may be evolved packet cores (EPCs). In some cases, the network 112 can include a satellite network.

A RAN is part of a wireless telecommunication system which implements a radio access technology, such as GSM, UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage.

Turning to a general description, a mobile device, e.g., the client device 110, may include, without limitation, any of the following: computing device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

A three-message authentication process or protocol is disclosed in the present specification to enable the cargo tracking device 104 to mutually authenticate with one or more of the sensors 106 and derive an encryption key (e.g., a session key) that can be used to encrypt future data communications. In operation, each of the sensors 106 is provisioned with an identifier and a secret key pair including a public key and a private key of the sensor 106. The public key and the private key are concatenated, encrypted, and stored at the sensor 106. The sensor 106 does not store its public key or private key. Instead, each of the sensors 106 stores an encrypted concatenation of its public key and private key. The cargo processing server 108 is provisioned with the identifiers and the public keys of the sensors 106. The cargo tracking device 104 may obtain the identifier of the sensor 106 from a client. For example, a client may send the identifier of the sensor 106 to be paired with the cargo tracking device 104 to the cargo tracking device via the client device 110.

During the mutual authentication process, the cargo tracking device 104 searches to discover the sensor 106 using identifier of the sensor 106 via a short range communications protocol (e.g., 802.15.4 or bluetooth) and the sensor 106 may join the cargo tracking device's personal area network (PAN). Then, the cargo tracking device 104 queries the cargo processing server 108 for the public key of the sensor 106 using the identifiers of the sensor 106. Once the cargo tracking device 104 discovers the sensor 106 and obtains the public key of the sensor 106, the cargo tracking device 104 transmits an authentication request message to the sensor 106. The authentication request message includes an encryption key that the sensor 106 can use to decrypt the stored encrypted public key/private key pair. The encryption key is generated by the cargo tracking device 104 based on the public key of the sensor 106.

Upon receiving the authentication request message, the sensor 106 decrypts the encrypted public key/private key pair using the encryption key included in the authentication request message. Then, the sensor 106 obtains its public key and generates another encryption key that can be used by the sensor 106 to authenticate the authentication request message. If the sensor 106 successfully authenticates the authentication request message, the sensor 106 generates a session key that will be used by the cargo tracking device 104 and the sensor 106 for future communications. Then, the sensor 106 generates and sends an authentication response message to the cargo tracking device 104. The authentication response message includes a confirmation of the sensor 106 that is encrypted using the session key.

Upon receiving the authentication response message, the cargo tracking device 104 computes the session key based at least in part on the public key of the sensor 106. Then, the cargo tracking device 104 authenticates the authentication response message using the session key and verifies the confirmation of the sensor 106 in the authentication response message. If the cargo tracking device 104 successfully authenticates the authentication response message and verifies the confirmation of the sensor 106, the cargo tracking device 104 generates and sends an authentication confirmation message to the sensor 106.

Upon receiving the authentication confirmation message, the sensor 106 authenticates the authentication confirmation message using the session key and verifies the content of the authentication confirmation message. If the sensor 106 successfully authenticates the authentication confirmation message and verifies the content of the authentication confirmation message, a secure communications channel/protocol is deemed to be established between the cargo tracking device 104 and the sensor 106.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
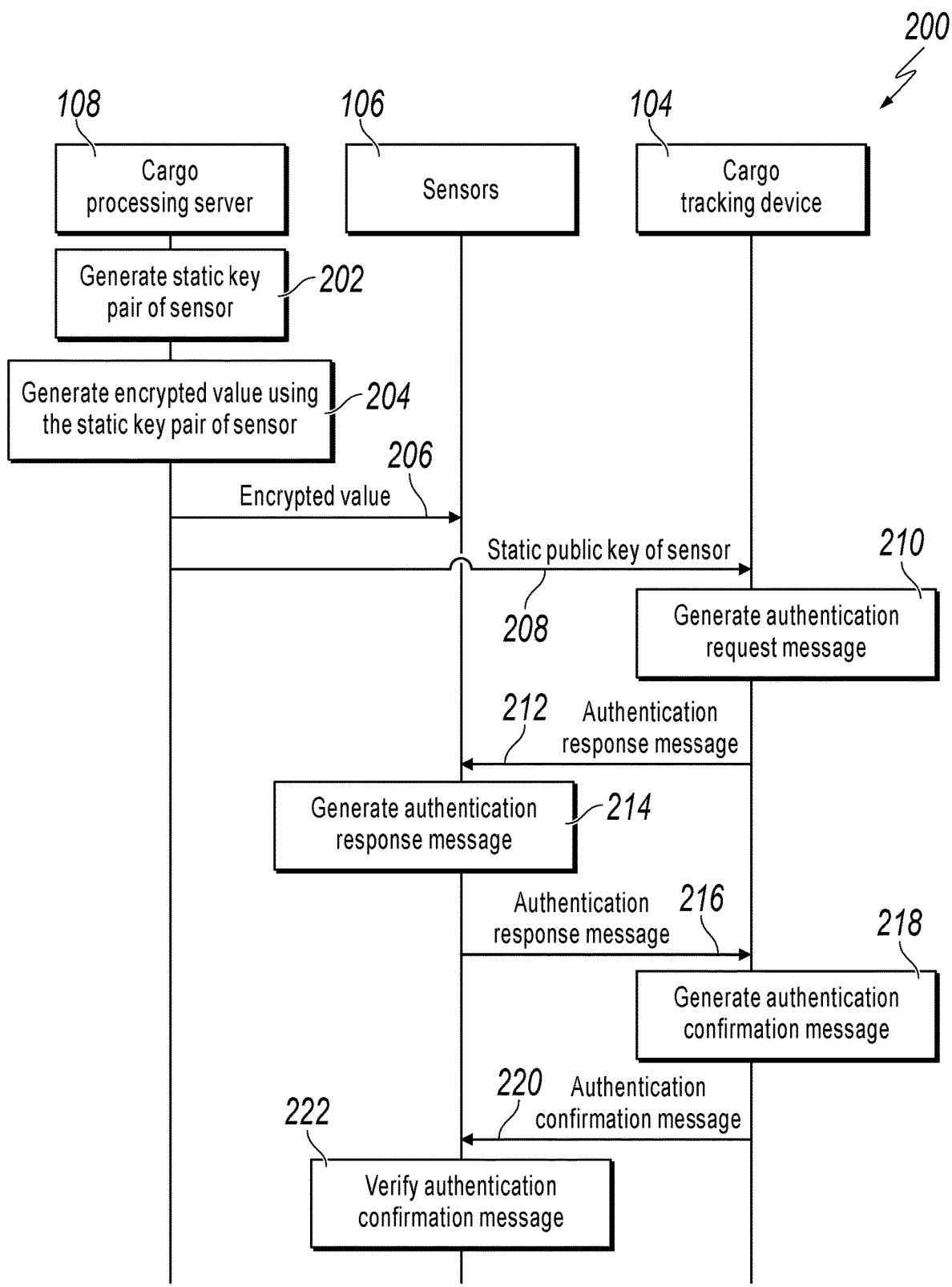
FIG. 2 is a flowchart showing an example process for performing a mutual authentication process in a cargo shipping system according to an implementation.

FIG. 2 is a flowchart showing an example process 200 for performing a mutual authentication process in a cargo shipping system according to an implementation. The process 200 can be implemented by a cargo processing server, e.g., the cargo processing server 108 shown in FIG. 1. The example process 200 shown in FIG. 2 can be implemented using additional, fewer, or different operations, which can be performed in the order shown or in a different order.

The example process 200 begins at 202, where a secret key pair of a sensor 106 is generated at the cargo processing server 108. In alternative implementations, the secret key pair of the sensor 106 is generated at the sensor 106 or any other suitable entities, e.g., a manufacturer of the sensor 106. If the secret key pair of the sensor 106 is generated at the sensor 106 or any entities other than the cargo processing server 108, the secret key pair of the sensor 106 is made available to the cargo processing server 108. For example, the cargo processing server 108 may obtain the public key of the sensor 106 from the manufacturer of the sensor 106. The public key of the sensor 106 that is stored at the cargo processing server 108 can be revealed to verified cargo tracking devices 104. In order to obtain the public key of the sensor 106, the cargo tracking device 104 provides a unique identifier that identifies the sensor 106. In some implementations, the sensor 106 is provisioned with a unique identifier during manufacturing. For example, an identifier may be created and assigned to a sensor 106 by the manufacturer during manufacturing. The identifier may be attached or printed on a surface of the sensor 106. In some examples, the identifier can be a concatenation of a combination of a sensor type identifier, a manufacturing identifier, and a unique identifier for the sensor. It is generally difficult to guess a random value of the unique identifier of a sensor 106, thereby preventing a compromised cargo tracking device 104 from obtaining sensor public keys. In some implementations, the cargo processing server 108 obtains the identifiers of the sensors 106 from the manufacturer and stores the identifiers that are associated with the key pair of the sensors 106 in its memory. In alternative implementations, a client (e.g., a customer who purchased sensor 106) can use a client device 110 to enter the identifier and public key of the sensor 106 to the cargo processing server 108.

In some implementations, elliptic curve cryptography (ECC) is used to generate the secret key pair of the sensor 106. For example, ECMQV key agreement may be used herein for the generation of the key pair of the sensor 106 and/or the cargo tracking device 104. ECMQV is a key agreement scheme that aims to efficiently provide basic security properties such as mutual authentication and confidentiality (as mentioned above) and advanced security properties such as forward secrecy and key-compromise impersonation (KCI) resistance. These advanced properties may be pertinent to the communications model of the cargo tracking device 104 and the sensor 106 as discussed herein. For example, suppose that an adversary plants a recording device (a bug) in a shipping container, such as inside a shipped item. It may record all the communication between the cargo tracking device and sensor. At arrival of the shipped item, the adversary may confiscate a sensor, and extract all its secrets. Then this adversary cannot use the extract secrets to decrypt the data recorded by the bug, which is demonstrated as forward secrecy. As another example, suppose that an adversary takes a cargo tracking device and extracts all its secrets, including its elliptic curve (EC) private keys. Then an adversary cannot use the cargo tracking device's secrets against the cargo tracking device to impersonate bogus sensors, fooling the cargo tracking device, which is demonstrated as KCI resistance.

The elliptic curves used for authentication between the cargo tracking device 104 and the sensor 106 are over a prime field. In some implementations, the authentication protocol as discussed herein uses the curve secp256r1, which is known as National Institute of Standards and Technology (NIST) curve P-256. In alternative implementations, any other suitable curves may be used, for example such as 4-way elliptic curve Diffie-Hellman (ECDH) and signed ephemeral ECDH. In 4-way ECDH, each side has two public keys, one static and ephemeral, and ECDH is done 4 times using every combination of keys from opposite sides. The resulting four shared secrets are then hashed (or added) together, in a mutually interoperable order. This alternative can be implemented given only a hash function and an ECDH implementation (i.e., elliptic curve scalar multiplication). With signed ephemeral ECDH, the cargo tracking device 104 and sensor 106 use ephemeral ECDH, and then authenticate their ephemeral EC public keys, using the static EC public keys.

As noted above, the authentication protocol makes use of the NIST P-256 elliptic curve. The components of the system 100 also support SHA256 and AES-256-GCM. The hash algorithm for key derivation, the length of the key for Advanced Encryption Standard with Galois/Counter Mode (AES-GCM), and the size of the nonce used in the authentication protocol depend on the length of the prime, p, used in constructing the elliptic curve as shown in Table 1.

TABLE 1

Key and Nonce length dependency on Prime Length

| Length of prime | Hash algorithm | AES-GCM key length | Nonce length |
|---|---|---|---|
| Len(p) ≤ 256 | SHA256 | 256 | 128 |
| 256 < len(p) ≤ 384 | SHA384 | 384 | 192 |
| len(p) > 384 | SHA512 | 512 | 256 |

Points on the elliptic curve are transmitted in protocol messages by converting both coordinates of the point into a single octet string using the Elliptic-Curve-Point-to-Octet-String conversion technique. Upon receipt of an elliptic curve point in a protocol message, the recipient reconstructs the point by converting the octet string into a point using the Octet-String-to-Elliptic-Curve-Point conversion technique. All received points shall be verified to be on the elliptic curve by checking that the received coordinates satisfy the equation of the curve, $y^2=x^3+ax+b$ has a solution (x,y) or (x,−y), excluding the "point-at-infinity." The initial output of an ECMQV operation is a scalar value representing the x-coordinate of the point. When used as an input to a function, the scalar is first converted into an octet string by using the Field-Element-to-Octet-String conversion.

In some cases, the secret key pair of the sensor 106 as generated at 202 includes a static EC public key and a static EC private key of the sensor 106. The static EC public key and static EC private key of the sensor 106 are long term secret keys that can be used for multiple message exchange processes or sessions. As discussed herein, the static EC public key of the sensor 106 is denoted as 'Ps' and the static EC private key of the sensor 106 is denoted as 'ds' in the present specification. The static EC private key ds is generated randomly and kept secret. The static EC key pair of the sensor 106 will be securely deleted from the sensor 106 after an encrypted value of the static EC key pair is generated.

At 204, an encrypted value is generated for the sensor 106 using the static key pair of the sensor 106. In some implementations, the encrypted value is generated by the cargo processing server 108. In alternative implementations, the encrypted value can be generated at the sensor 106 or any other suitable entities, such as a manufacturer of the sensor 106. The encrypted value of the sensor 106 is generated as an encrypted concatenation of the static public key Ps and the static private key ds of the sensor 106 using a temporary key denoted as '$K_2$'. The temporary key $K_2$ can be generated or computed using a predetermined key derivation function (KDF). For example, the temporary key $K_2$ can be generated or computed as $K_2$=KDF (KDF (Ps)). In some implementations, the predetermine KDF used for generating the temporary key $K_2$ includes American National Standards Institute (ANSI) X9.63 KDF. In alternative implementations, the temporary key $K_2$ can be generated or computed using any other suitable KDFs, for example such as, concatenation KDF as defined by NIST or Hashed message authentication code (HMAC)-based key derivation function (HKDF) as defined by NIST and Internet Engineering Task Force (IETF). The concatenation KDF as defined by NIST reverses the order of the shared secret input and the counter, and requires labels to identity the parties involved. The HKDF as defined by NIST and IETF has an improved ability to extract secrets from biased entropy sources, and is directed to a way to derive longer keys whose security analysis assumes less about the security of the underlying hash function. In some cases, ANSI X9.63 KDF can be chosen for simplicity.

After determining the temporary key $K_2$, the static public key Ps and the static private key ds of the sensor 106 are concatenated and encrypted using the temporary key $K_2$. For example, a permanent encapsulation or encrypted value ts=$\{ds|Ps\}_{K2}$ is generated by the cargo processing server 108 for the sensor 106. In some implementations, the encrypted value ts of sensor 106 is generated using AES-GCM.

AES-GCM discussed herein is an algorithm used to wrap cleartext into ciphertext, with the following notation: ciphertext=$\{cleartext\}_K$. When an AES-GCM ciphertext is received by a recipient with the same key K, the recipient can verify the authenticity of the ciphertext using the key K. This is like a message authentication code (MAC), except that AES-GCM integrates the message authentication with the message encryption. In some cases, AES-GCM may temporarily create a candidate cleartext before the authentication is completed. In some cases, an AES-GCM ciphertext includes initialization vectors, which are effectively nonces. The initialization vectors are used to ensure that the same cleartext generates a different ciphertext for every application of AES-GCM, which is an essential security goal. In the key agreement protocol between the cargo tracking device 104 and the sensor 106 discussed herein, this threat can be reduced by the fact that one potential risk of nonce is that they might be misused as subliminal channel to leak or exfiltrate secrets. In the authentication protocol discussed herein, the devices are relatively simple and controlled, and unlikely to have such malware. Some encryption modes, such as synthetic initialization vector (SIV), aim to prevent these kinds of nonce misuse attacks (among other) things.

In some cases, data or messages that are transmitted between the cargo tracking device 104 and the sensor 106 have a format of the following: Cleartext1, $\{Cleartext2\}_K$, where Cleartext1 represents the auxiliary authenticated data (AAD) in GCM. This ensures that Cleartext1 is authenticated by key K even though it is not encrypted. An alternative notation to the notation $\{cleartext\}_K$ is AES-GCM(K, cleartext), or more generally AES-GCM(K, cleartext1, cleartext2) or AES-GCM$_K$(visible-text, (hidden-text)).

At 206, the cargo processing server 108 sends the encrypted value ts to the sensor 106. The encrypted value ts is received and stored by the sensor 106 permanently for future use. All other copies of the private key ds of the sensor 106 are deleted except the one that is encrypted in the encrypted value ts. All other copies of the public key Ps of the sensor 106 are deleted except the one that is stored in the secure database of the cargo processing server 108.

At 208, the cargo processing server 108 sends the static public key Ps of the sensor 106 to the cargo tracking device 104. In some implementations, a user can initiate the pairing process by sending a pairing request to the cargo processing server 108 to pair a sensor 106 with the cargo tracking device 104 via the client device 110. For example, the user may send the pairing request to the cargo processing server 108, by using the client device 110, or by interacting with a website associated with the cargo processing server 108. The pairing request can include an identifier of the sensor 106. Then, the cargo processing server 108 can send a notification to the cargo tracking device 104 and trigger the cargo tracking device 104 to start pairing process. The notification can include the identifier of the sensor 106. The notification can also include the static public key of the sensor 106. Alternatively, the cargo tracking device 104 can sends a request to the cargo processing server 108 to request a static public key of the sensor 106 after receiving the notification, and the cargo processing server 108 can send the static public key of the sensor 106 in response. In alternative implementations, a user can enter the identifier of the sensor 106 to the cargo tracking device 104 via the client device 110 or a user interface of the cargo tracking device 104, which indicates an initialization of the pairing process of the sensor 106 with the cargo tracking device 104. The cargo tracking device can then request the static public key of the sensor 106 from the cargo processing server 108.

The cargo tracking device 104 can use the identifier of the sensor 106 to query the cargo processing server 108 for the static public key of the sensor 106. Upon receiving the identifier of the sensor 106 from the cargo tracking device 104, the cargo processing server 108 verifies the identifier and sends a static public key corresponding to the verified identifier to the cargo tracking device 104. The identifier of the sensor 106 can be used by the cargo tracking device 104 to search and discover the sensor 106. In some implementations, the cargo tracking device 104 may discover the sensor 106 via a short distance wireless network technology, for example such as, Bluetooth, or IEEE 802.15.4 based specification (e.g., ZigBee) and the sensor 106 can then join the cargo tracking device's PAN.

At 210, the cargo tracking device 104 initiates the authentication process by generating an authentication request message. The authentication request message includes the key $K_2$ previously determined as KDF (KDF (Ps)), and an encryption of a static EC public key $P_H$ and an ephemeral EC public key $Q_H$ of the cargo tracking device 104 that are protected by a derived key denoted herein as $K_1$. For example, the authentication request message may have a following format: $K_2$, $\{P_H|Q_H\}_{K1}$. The derived key $K_1$ computed using the static public key Ps of the sensor 106 according to a predetermined KDF. For example, the derived key $K_1$ may be generated or computed as KDF (Ps). The generation of the authentication request message will be discussed in greater detail below with reference to FIG. 3.

Figure 3:
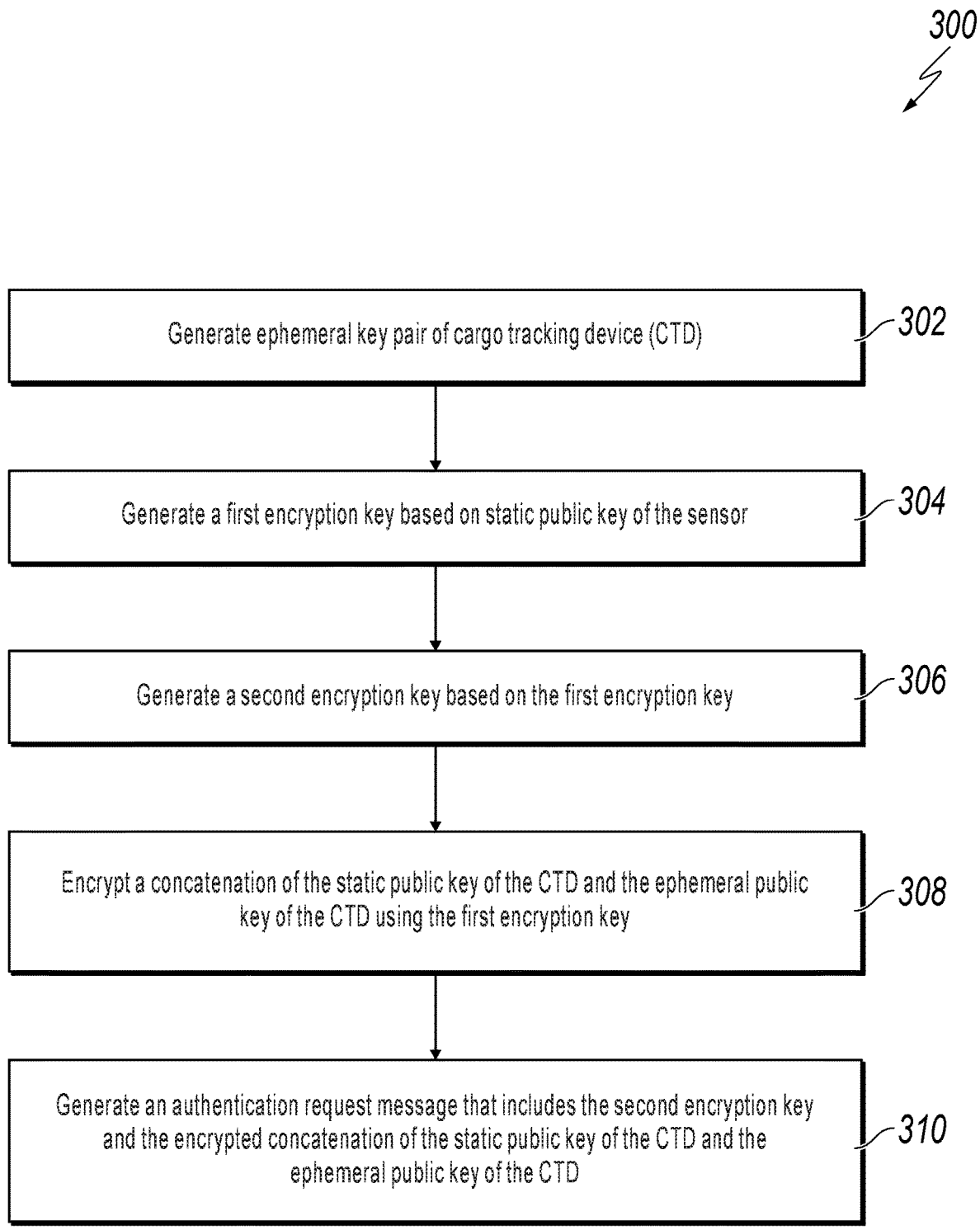
FIG. 3 is a flowchart showing an example process for generating an authentication request message according to an implementation.

Referring to FIG. 3, at 302, the cargo tracking device 104 generates an ephemeral key pair including an ephemeral public key and an ephemeral private key of the cargo tracking device 104. In some implementations, the ephemeral key pair of the cargo tracking device 104 are generated using the ECMQV key agreement. For example, the cargo tracking device 104 may generate an ephemeral EC key pair including an ephemeral EC public key denoted as $Q_H$ and an ephemeral EC private key denoted as ex.

At 304, the cargo tracking device 104 computes a first encryption key $K_1$ based on the static public key of the sensor 106. In some implementations, the first encryption key $K_1$ is computed based on the static EC public key Ps of the sensor 106 using a predetermined KDF. For example, the first encryption key $K_1$ can be compute as $K_1$=KDF (Ps).

At 306, the cargo tracking device 104 computes a second encryption key $K_2$ based on first encryption key $K_1$ or the static public key of the sensor 106. In some implementations, the second encryption key $K_2$ is computed based on the first encryption key $K_1$ or the static EC public key Ps of the sensor 106 using a predetermined KDF. For example, the second encryption key $K_2$ can be computed as $K_2$=KDF ($K_1$) or $K_2$=KDF (KDF (Ps)).

At 308, the cargo tracking device 104 encrypts a concatenation of a static public key and the ephemeral public key of the cargo tracking device 104 using the first encryption key $K_1$. In some implementations, the cargo tracking device 104 is provisioned with a static public key and a static private key during manufacturing. For example, the cargo tracking device 104 may store a static EC public key denoted as $P_H$ and a static EC private key denoted as $d_H$ at its memory. The cargo tracking device 104 may retrieve the static EC public key $P_H$ and concatenate it with its ephemeral EC public key $Q_H$ as previously generated at 302. Then, the cargo tracking device 104 may encrypt the concatenation of the static EC public key $P_H$ and the ephemeral EC public key $Q_H$ using the first encryption key $K_1$ and generate an encrypted value $\{P_H|Q_H\}_{K1}$.

At 310, the cargo tracking device 104 generates an authentication request message that includes the second encryption key $K_2$ and the encrypted concatenation of the static public key and the ephemeral public key of the cargo tracking device 104. For example, the cargo tracking device 104 may generate the authentication request message as having the following format: $K_2$, $\{P_H|Q_H\}_{K1}$. Here, both the static EC public key $P_H$ and the ephemeral EC public key $Q_H$ of the cargo tracking device 104 are authenticated using AES-GCM with key $K_1$.

In some alternative implementations, the cargo tracking device 104 may store its static EC public key $P_H$ in a mini-certificate, such as an ECMQV implicit certificate. This may require the sensor 106 to verify the certificate or recover the static EC public key $P_H$ from the certificate. The sensor 106 may also store an authentic copy of a certification authority's public key.

Referring back to FIG. 2, at 212, after generating the authentication request message, the cargo tracking device 104 sends it to the sensor 106. The cargo tracking device 104 now waits for the sensor 106 to respond. In some implementations, if the sensor 106 does not respond within a predetermined time window, the cargo tracking device 104 may delete its ephemeral key pair, for example such as, the ephemeral EC public key $Q_H$ and the ephemeral EC private key $e_H$.

At 214, upon receiving the authentication request message from the cargo tracking device 104, the sensor 106 generates an authentication response message. In some implementations, the authentication response message includes the sensor's ephemeral EC public key Qs, a confirmation message in ASCII English text, and a cryptographic nonce. The confirmation message and the cryptographic nonce are encrypted. The entire authentication response message is authenticated using AES-GCM with a session key that is a result of the ECMQV key agreement. The generation of the authentication request message will be discussed below in greater detail with reference to FIG. 4.

Figure 4:
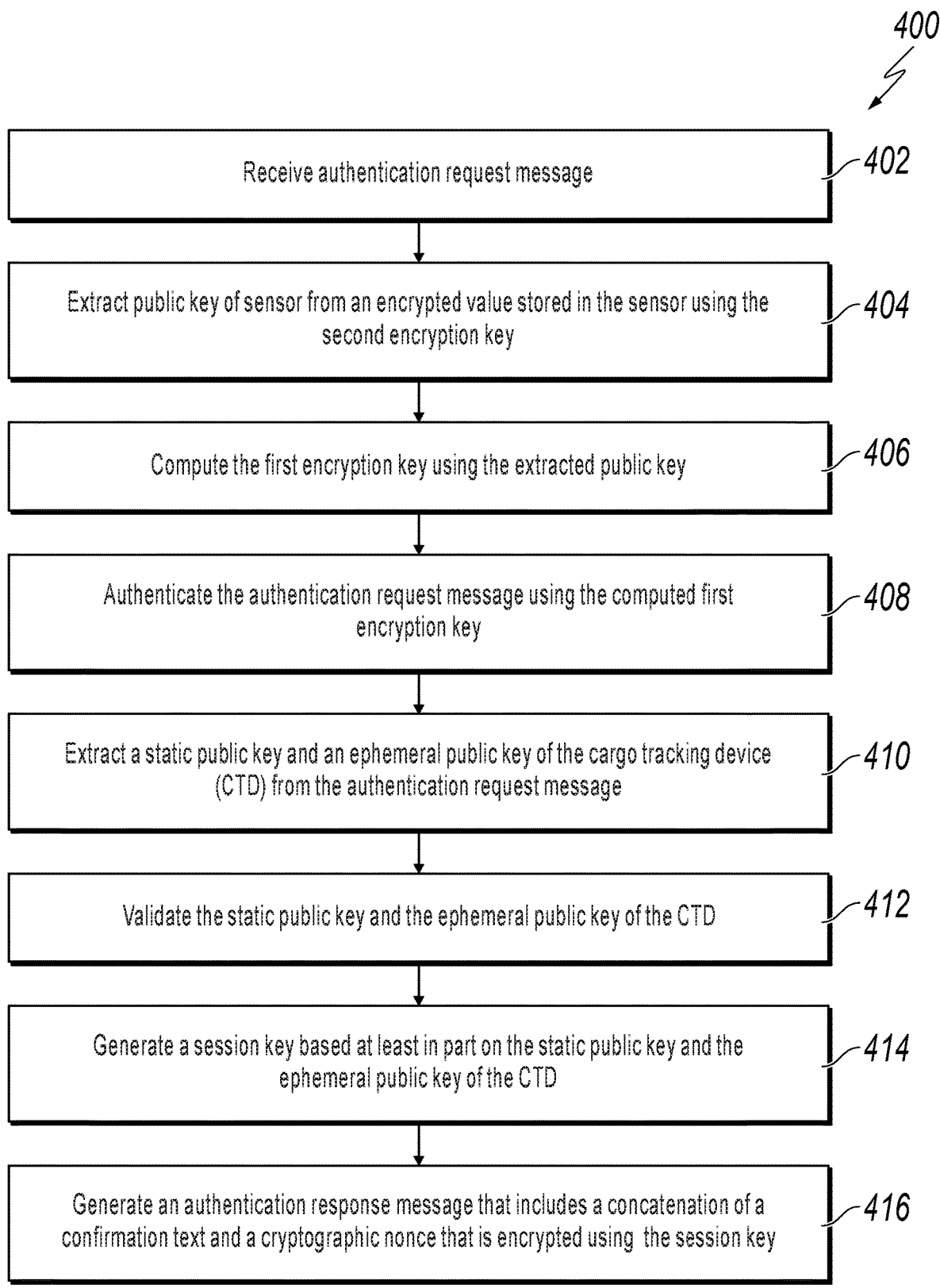
FIG. 4 is a flowchart showing an example process for generating an authentication response message according to an implementation.

Referring to FIG. 4, at 402, the sensor 106 receives the authentication request message from the cargo tracking device 104. The authentication request message includes the second encryption key $K_2$ and the encrypted concatenation of the static public key $P_H$ and the ephemeral public key $Q_H$ of the cargo tracking device 104. For example, the authentication request message may have the following format: $K_2$, $\{P_H|Q_H\}_{K1}$.

At 404, the sensor 106 extracts its static public key Ps from the encrypted value ts previously stored at the sensor 106 using the second encryption key $K_2$ in the authentication request message. As noted before, the sensor 106 stores the encrypted value ts=$\{ds|Ps\}_{K2}$ in its memory. The encrypted value ts includes a concatenation of the static EC public key Ps and static private key ds of the sensor 106 that is encrypted using the second encryption key $K_2$. The sensor 106 can obtain the second encryption key $K_2$ from the authentication request message, use the second encryption key $K_2$ to decrypt the encrypted value ts and obtain its static EC public key Ps.

The sensor 106 can also authenticate the encrypted value ts using the second encryption key $K_2$ according to AES-GCM authentication. If the AES-GCM authentication of ts using key $K_2$ fails, the sensor 106 can reject the authentication request message. Alternatively, if the decryption of the encrypted value ts does not parse as ds|Ps, the sensor 106 can also reject the authentication request message. For example, the sensor 106 may verify whether the keys ds and Ps can form a key pair according to a generator denoted as G, by checking whether Ps=ds*G is true.

At 406, after obtaining its static EC public key Ps, the sensor 106 computes the first encryption key $K_1$ using the static EC public key Ps. The first encryption key $K_1$ can be computed using the static EC public key Ps according to a predetermined KDF. For example, the first encryption key $K_1$ can be computed by the sensor 106 as $K_1$=KDF (Ps).

At 408, the sensor 106 authenticates the authentication request message using the first encryption key $K_1$ as computed at 406. In some implementations, the sensor 106 authenticates the authentication request message including the second encryption key $K_2$ using AES-GCM with the first encryption key $K_1$. If the sensor 106 fails to authenticate the authentication request message, the sensor 106 can reject the authentication request message.

At 410, if the sensor 106 successfully authenticates the authentication request message using the first encryption key $K_1$, the sensor 106 extracts the static EC public key $P_H$ and the ephemeral EC public key $Q_H$ of the cargo tracking device 104 from the authentication request message. In some implementations, the sensor 106 obtains the static EC public key $P_H$ and the ephemeral EC public key $Q_H$ according to an AES-GCM decryption process.

At 412, the sensor 106 validates the static EC public key $P_H$ and the ephemeral EC public key $Q_H$ of the cargo tracking device 104 that are previously obtained at 410. In some examples where a mini-certificate is used to convey the static EC public key $P_H$ of the cargo tracking device 104, the public key $P_H$ can be assigned by a certification authority. The sensor 106 can further store a public key of the certification authority and verify the signature included in the mini-certificate by using the public key of the certification authority. In some implementations, the sensor 106 can validate the static EC public key $P_H$ and the ephemeral EC public key $Q_H$ by authenticating the key $P_H$ and the key $Q_H$ using AES-GCM with the first encryption key $K_1$.

At 414, the sensor 106 generates a session key based at least in part on the static EC public key $P_H$ and the ephemeral EC public key $Q_H$ of the cargo tracking device 104. The session key may be generated further based in part on an ephemeral key pair of the sensor 106. The sensor 106 may generate an ephemeral EC public key Qs and an ephemeral EC private key es. Then, the sensor 106 performs an ECMQV key agreement operation to compute a shared secret point as follows: $Z=(es+Qs*ds)*(Q_H+Q_H*P_H)$. Next, the sensor 106 generates the session key denoted as K by computing K=KDF (Z.x), where Z.x represents the x-coordinate of the computed shared secret point.

At 416, the sensor 106 generates an authentication response message that includes a concatenation of a confirmation text and a cryptographic nonce that is encrypted using the session key K as determined at 414. For example, the sensor 106 may generate a random cryptographic nonce denoted as Ns, and concatenate an ASCII English text with Ns. The sensor 106 then encrypts the concatenation of the ASCII English text and Ns using AES-GCM with the session key K. The sensor 106 can also provide its ephemeral EC public key Qs as auxiliary authenticated data (AAD) in AES-GCM to form the authentication response message. In some implementations, the authentication response message has the following format: Qs, {"Sensor confirmation"|Ns}$_K$, where "Sensor confirmation" represents the ASCII English confirmation text and can include any suitable content. The ephemeral EC public key Qs of the sensor 106 can be authenticated by the with the session key K using the AAD feature of AES-GCM.

Referring back to FIG. 2, at 216, the sensor 106 sends the authentication response message to the cargo tracking device 104 in response to the authentication request message. After sending the authentication response message, the sensor 106 may securely delete the following values: the ephemeral EC private key es of the sensor 106, the second encryption key $K_2$, the static EC public key $P_H$ of the cargo tracking device 104, the ephemeral EC public key $Q_H$ of the cargo tracking device 104, the static EC public key Ps of the sensor 106, and the static EC private key ds of the sensor 106. The sensor 106 may keep the following values: the encrypted value is ={ds|Ps}$_{K2}$, the session key K, the sensor's nonce Ns, the static EC public key $P_H$ of the cargo tracking device 104, and the first encryption key $K_1$, where the session key K is used to protect all subsequent traffic, the nonce Ns will be used in the stage of the key agreement protocol between the cargo tracking device 104 and the sensor 106.

Now, the sensor 106 waits for the cargo tracking device 104 to response after sending the authentication response message to the cargo tracking device 104.

At 218, upon receiving the authentication response message from the sensor 106, the cargo tracking device 104 generates an authentication confirmation messages. In some implementations, the authentication confirmation message includes a status field, a confirmation message in ASCII English text, and a cryptographic nonce. The confirmation message and the cryptographic nonce are encrypted. The entire authentication response message is authenticated using AES-GCM with a session key that is a result of the ECMQV key agreement. The generation of the authentication confirmation message will be discussed below in greater detail with reference to FIG. 5.

Figure 5:
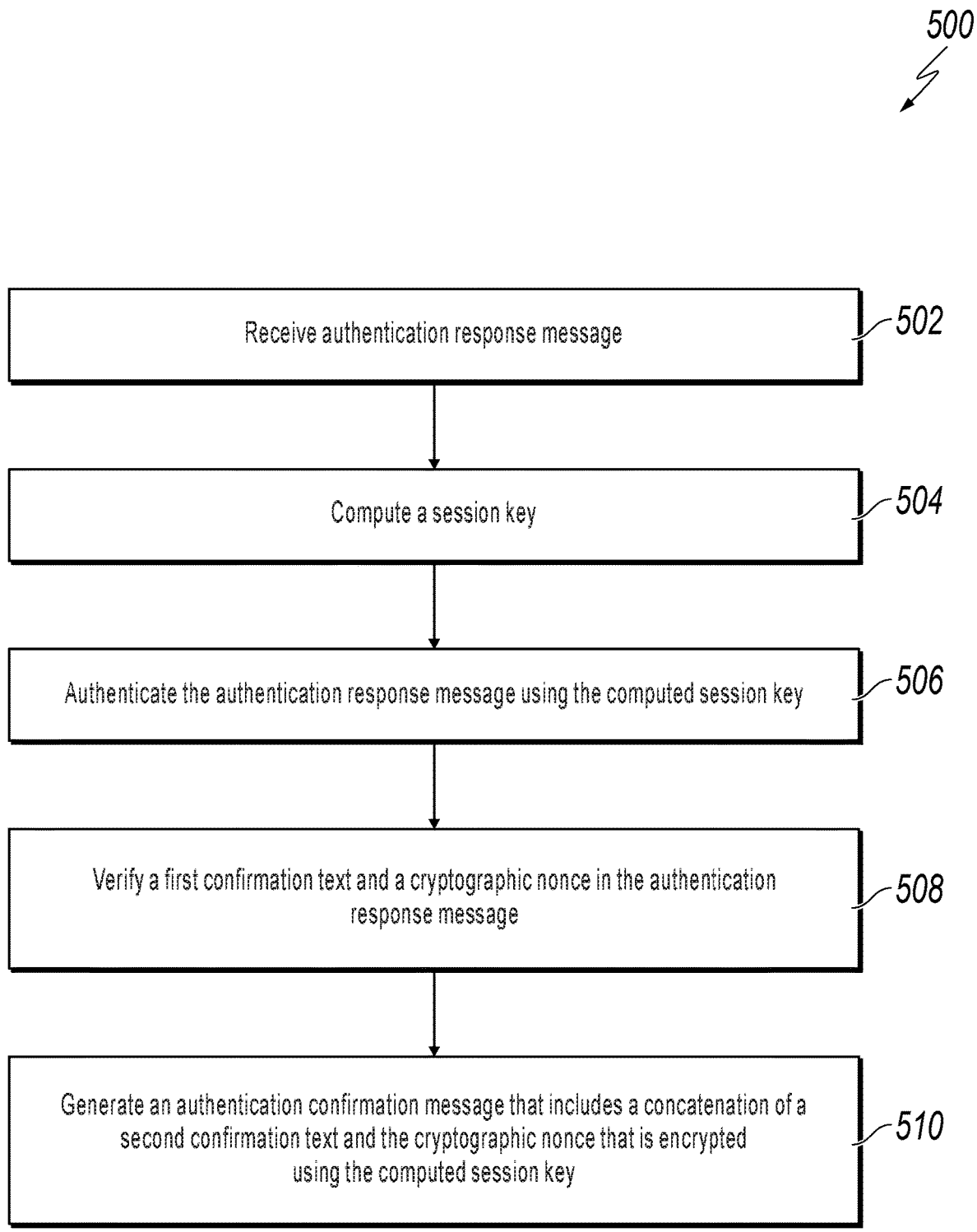
FIG. 5 is a flowchart showing an example process for generating an authentication confirmation message according to an implementation.

Referring to FIG. 5, at 502, the cargo tracking device 104 receives the authentication response message from the sensor 106. In some implementations, the authentication response message has the following format: Qs, {"Sensor confirmation"|Ns}$_K$, where Qs represents an ephemeral EC public key of the sensor 104, "Sensor confirmation" represents a confirmation text of the sensor 104, Ns represents a random cryptographic nonce, and K represent a session key.

At 504, the cargo tracking device 104 computes the session key K. In some implementation, the cargo tracking device 104 computes the session key K based in part on the ephemeral EC private key ex of the cargo tracking device 104, the ephemeral EC public key $Q_H$ of the cargo tracking device 104, the static EC private key $d_H$ of the cargo tracking device 104, the ephemeral EC public key Qs of the sensor 106, and the static EC public key Ps of the sensor 106. For example, the cargo tracking device 104 computes a shared secret point $Z=(e_H+Q_H*d_H)*(Qs+Qs*Ps)$ and then computes the session key K=KDF(Z.x), where Z.x represents the x-coordinate of the computed shared secret point.

At 506, the cargo tracking device 104 authenticates the authentication response message using the session key as computed at 504. For example, the cargo tracking device 104 can authenticate the entire authentication response message including the ephemeral EC public key Qs of the sensor 106 using AES-GCM with the session key K. If the cargo tracking device 104 fails to authenticate the authentication response message, the cargo tracking device 104 can reject the authentication response message.

At 508, the cargo tracking device 104 verifies the confirmation text of the sensor 106 and the cryptographic nonce in the authentication response message. The cargo tracking device 104 can decrypt the encrypted part of the authentication response message using the session key K to obtain the confirmation text of the sensor 104 and the random cryptographic nonce Ns. If the decrypted message is not parsed as a cleartext such as {"Sensor confirmation"|Ns}, the cargo tracking device 104 can reject the authentication response message. If the random cryptographic nonce Ns does not have a correct length, the cargo tracking device 104 can also reject the authentication response message. Upon any type of rejection of the authentication response message, the cargo tracking device 104 sets the status field of the authentication confirmation message to STATUS_AUTH_FAILURE to indicate a failure of the authentication, and sends a message to the sensor 106 to indicate the authentication failure that has the following format: Status, H ($P_H$), {Ns}$_{K1}$, where Status represents the status field, H ($P_H$) represent a hashed value of the static EC public key $P_H$ of the cargo tracking device 104, and {Ns}$_{K1}$ represents the nonce Ns that is encrypted using the first encryption key $K_1$.

At 510, if the cargo tracking device 104 successfully authenticates the authentication response message and verifies the content of the authentication response message, the cargo tracking device 104 generates an authentication confirmation message that includes a concatenation of a confirmation text and the cryptographic nonce that is encrypted using the session key as computed at 504. For example, the cargo tracking device may concatenate an ASCII English confirmation text with the cryptographic nonce Ns. The cargo tracking device then encrypts the concatenation of the ASCII English confirmation text and Ns using AES-GCM with the session key K. The sensor 106 can set the status field to STATUS_OK. In some implementations, the authentication confirmation message is generated using AES-GCM and has the following format: Status, {"Cargo tracking device confirmation"|Ns}$_K$, where "Cargo tracking device confirmation" represents the ASCII English confirmation text and can include any suitable content.

Referring back to FIG. 2, at 220, the cargo tracking device 104 sends the authentication confirmation message to the sensor 106.

At 222, upon receiving the authentication confirmation message from the cargo tracking device 104, the sensor 106 verifies the authentication confirmation message. For example, the sensor 106 may validates the AES-GCM authentication of the authentication confirmation message and validates the expected ASCII confirmation text and the nonce Ns in the message.

In some implementations, the sensor 106 inspects the status field of the authentication confirmation message. If the status filed is shown as STATUS_AUTH_FAILURE, the sensor 106 may enter an error state. The sensor 106 can use AES-GCM with the first encryption key $K_1$ to authenticate the message having the following format: Status, H ($P_H$), {Ns}$_{K1}$. If the AES-GCM authentication fails, or the message content H ($P_H$) and Ns does not match the corresponding values based on the sensor's version of the values, the sensor 106 deems the confirmation message as a potential bogus or false message. The sensor 106 may wait for a predetermined time period for a confirmation message that includes the status of STATUS_OK. If the STATUS_AUTH_FAILURE validates completely, the sensor 106 reverts to its initial state and securely deletes all remaining temporary values, including the session key K, the first encryption key $K_1$, the static EC public key $P_H$ of the cargo tracking device 104, and the nonce Ns.

If the status filed is shown as STATUS_OK, the sensor 106 uses AES-GCM to verify the authenticity of the entire authentication confirmation message using the session key K. If the authentication fails, the sensor 106 aborts the authentication process and securely deletes all remaining temporary values and reverts to its initial state.

Upon successful AES-GCM verification of the authentication confirmation message, the sensor 106 parses the encrypted part of the authentication confirmation message with the session key K. As noted before, the authentication confirmation message has the following format: Status, {"Cargo tracking device confirmation"|Ns}$_K$. The sensor 106 can use the session key K to decrypt the message and obtain the confirmation text and the nonce Ns. If the confirmation text does not include an expected ASCII English text, and/or the nonce Ns does not have the correct length and value, the sensor 106 aborts the authentication process, securely deletes all temporary values, and reverts to its initial state.

Upon completion of the authentication process or protocol, the cargo tracking device 104 and the sensor 106 share a common session key K, which can be used as a pairwise symmetric key between the cargo tracking device 104 and the sensor 106. The cargo tracking device 104 and the sensor 106 securely delete all remaining temporary values except the session key K. Note that the sensor 106 still keeps the encrypted value ts.

In some implementations, the messages of the mutual authentication process are exchanged using IEEE 802.15.4 data frames as shown below.

Attributes

The attributes are defined to have a common general format consisting of a 1 octet Attribute ID field, a 1 octet Length field and variable-length attribute-specific information fields, as shown in Table 2. Both fields are encoded in little endian byte order.

TABLE 2

General format of attributes

| Field | Size (octets) | Value (hexadecimal) | Description |
|---|---|---|---|
| Attribute ID | 1 | variable | Identifying the type of attribute. The specific values is defined in Table 3. |
| Length | 1 | variable | Length of the following fields in the attributes. |
| Attributes body field | variable | | Attribute-specific information fields. |

TABLE 3

Attribute ID definitions

| Attribute ID | Notes |
|---|---|
| 00 | Reserved |
| 01 | Status |
| 02 | Wrapped data |
| 03 | Key data |
| 04-FF | Reserved |

A device that encounters an unknown or reserved Attribute ID value in a frame received without error may either drop the frame or ignore the attribute and its associated fields, and parse any remaining fields for additional attributes with recognizable Attribute ID values. A device that encounters a recognizable but unexpected Attribute ID value in the received information may ignore that attribute.

Attribute Field Definitions

Status

The Status attribute body field is a single octet carrying a value from Table 4 as shown below.

TABLE 4

Status and error codes

| Status or Error | Value | Meaning |
| --- | --- | --- |
| STATUS_OK | 0 | No errors or abnormal behavior |
| STATUS_AUTH_FAILURE | 1 | Authentication failed |

Nonce Attributes

The payloads of the sensor nonce, and the cargo tracking device nonce contains the respective nonces and the length is determined by Table 3.

Authentication Frames Formats

Frame Structure

The frame format is specified in this specification and is an IEEE 802.15.4 data frame containing attributes as described below. The general format of the frames are shown in Table 5.

TABLE 5

Frame Header

| Field | Size (octets) | Description |
| --- | --- | --- |
| Frame type | 1 | Identifying the type of frame. The specific value is defined in Table 6 |
| Attributes | Variable | A series of one or more attributes |

TABLE 6

Authentication frame type

| Type | Notes |
| --- | --- |
| 0 | Authentication Request |
| 1 | Authentication Response |
| 2 | Authentication Confirm |
| 3-255 | Reserved |

Authentication Request Message Frame

The Authentication Request Message frame is transmitted by a cargo tracking device to a sensor to initiate authentication.

The Attributes in the Authentication Request Message frame are shown in Table 7.

TABLE 7

Attributes in the Authentication Request Message frame

| Attribute | Notes |
| --- | --- |
| Key data | The key derived from the sensor public key, Ps |
| Wrapped data | Cyphertext the public key, $P_H$, and the ephemeral public key, $Q_H$ for the cargo tracking device encrypted by $K_1$. |

Authentication Response Message Frame

The Authentication Response Message frame is transmitted by a sensor to a cargo tracking device to initiate an authentication in response to Authentication Request Message frame.

The attributes included in the Authentication Response Message frame are shown in Table 8.

TABLE 8

Attributes in the Authentication Response Message frame

| Attribute | Notes |
| --- | --- |
| Key data | The ephemeral public key of the sensor, Qs |
| Wrapped data | Cyphertext output of an ASCII text string concatenated with a Nonce generated by the sensor, encrypted by K |

Authentication Confirmation Message Frame

The Authentication Confirmation Message frame is transmitted by a cargo tracking device to a sensor to confirm authentication in response to an Authentication Response Message frame.

The attributes included in the Authentication Confirmation Message frame are shown in Table 9.

TABLE 9

Attributes in the Authentication Confirmation Message frame

| Attribute | Notes |
| --- | --- |
| Status | Status code |
| Key data | This attribute is optionally included if the status is set to STATUS_AUTH_FAILURE. It includes a hash of the public key of the cargo tracking device, $P_H$. |
| Wrapped Data | If status is set to STATUS_OK, wrapped data includes ciphertext output of the cargo tracking device response concatenated with the sensor nonce Ns if the status is set to STATUS_OK. If status is set to STATUS_AUTH_FAILURE, wrapped data includes ciphertext output of the sensor nonce Ns. |

Figure 6:
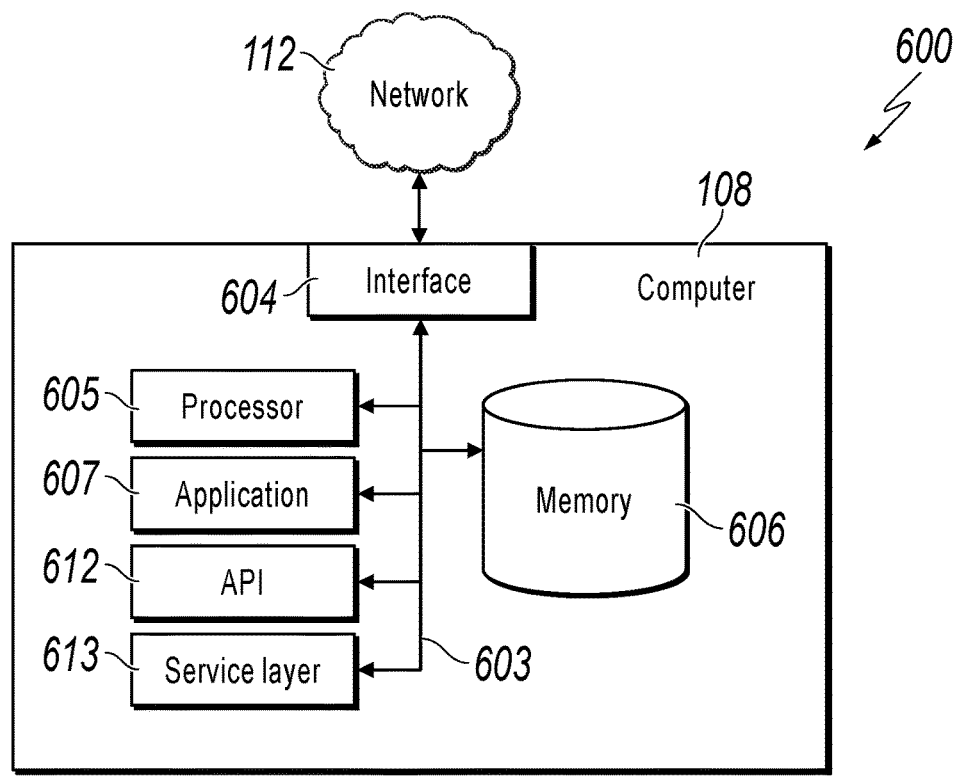
FIG. 6 illustrates a high level architecture block diagram of a cargo processing server according to an implementation.

FIG. 6 illustrates a high level architecture block diagram of the cargo processing server 108 according to an implementation. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The cargo processing server 108 includes a computing system configured to process cargo delivery information, including receiving CTU status notifications, selecting CTUs, selecting drivers, generating delivery requests, generating delivery records, generate static key pair of the sensor, generate encrypted static key pair of the sensor, or any combinations thereof. In some cases, the processing algorithm of the cargo delivery information can be implemented in an executable computing code, e.g., C/C++ executable codes. In some cases, the cargo processing server 108 can include a standalone Linux system that runs batch applications. In some cases, the cargo processing server 108 can include mobile or personal computers.

The cargo processing server 108 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The cargo processing server 108 can serve as a client, network component, a server, a database or other persistency, and/or any other components. In some implementations, one or more components of the cargo processing server 108 may be configured to operate within a cloud-computing-based environment.

At a high level, the cargo processing server 108 is an electronic computing device operable to receive, transmit, process, store, or manage cargo delivery data and information. According to some implementations, the cargo processing server 108 can also include or be communicably coupled with an application server, e-mail server, web server, caching server, streaming data server, business intelligence (BI) server, and/or other server.

The cargo processing server 108 can receive requests over network 112 from a client application and respond to the received requests by processing the requests in an appropriate software application. In addition, requests may also be sent to the cargo processing server 108 from internal users (e.g., from a command console or by another appropriate access method), external or third parties, other automated applications, as well as any other appropriate entities, individuals, systems, or computers.

Each of the components of the cargo processing server 108 can communicate using a system bus 603. In some implementations, any and/or all the components of the cargo processing server 108, both hardware and/or software, may interface with each other and/or the interface 604 over the system bus 603 using an application programming interface (API) 612 and/or a service layer 613. The API 612 may include specifications for routines, data structures, and object classes. The API 612 may be either computer language-independent or -dependent and refer to a complete interface, a single function, or even a set of APIs. The service layer 613 provides software services to the cargo processing server 108. The functionality of the cargo processing server 108 may be accessible for all service consumers using this service layer. Software services, such as those provided by the service layer 613, provide reusable, defined business functionalities through a defined interface. For example, the interface may be software written in JAVA, C++, or other suitable language providing data in Extensible Markup Language (XML) format or other suitable format. While illustrated as an integrated component of the cargo processing server 108, alternative implementations may illustrate the API 612 and/or the service layer 613 as stand-alone components in relation to other components of the cargo processing server 108. Moreover, any or all parts of the API 612 and/or the service layer 613 may be implemented as child or sub-modules of another software module, enterprise application, or hardware module without departing from the scope of this disclosure.

The cargo processing server 108 includes an interface 604. Although illustrated as a single interface 604 in FIG. 6, two or more interfaces 604 may be used according to particular needs, desires, or particular implementations of the cargo processing server 108. The interface 604 is used by the cargo processing server 142 for communicating with other systems in a distributed environment connected to the network 112 (whether illustrated or not). Generally, the interface 604 comprises logic encoded in software and/or hardware in a suitable combination and operable to communicate with the network 112. More specifically, the interface 604 may comprise software supporting one or more communication protocols associated with communications such that the network 112 or interface's hardware is operable to communicate physical signals within and outside of the cargo processing server 108.

The cargo processing server 108 includes a processor 605. Although illustrated as a single processor 605 in FIG. 6, two or more processors may be used according to particular needs, desires, or particular implementations of the cargo processing server 108. Generally, the processor 605 executes instructions and manipulates data to perform the operations of the cargo processing server 108. Specifically, the processor 605 executes the functionality required for processing cargo delivery data.

The cargo processing server 108 also includes a memory 606 that holds data for the cargo processing server 108. Although illustrated as a single memory 606 in FIG. 6, two or more memories may be used according to particular needs, desires, or particular implementations of the cargo processing server 108. While memory 606 is illustrated as an integral component of the cargo processing server 108, in alternative implementations, memory 606 can be external to the cargo processing server 108.

The application 607 is an algorithmic software engine providing functionality according to particular needs, desires, or particular implementations of the cargo processing server 108, particularly with respect to functionality required for processing cargo delivery data. Although illustrated as a single application 607, the application 607 may be implemented as multiple applications 607 on the cargo processing server 108. In addition, although illustrated as integral to the cargo processing server 108, in alternative implementations, the application 607 can be external to the cargo processing server 108.

There may be any number of the cargo processing server 108 associated with, or external to, and communicating over network 112. Further, this disclosure contemplates that many users may use one cargo processing server 108, or that one user may use multiple cargo processing servers 108.

Figure 7:
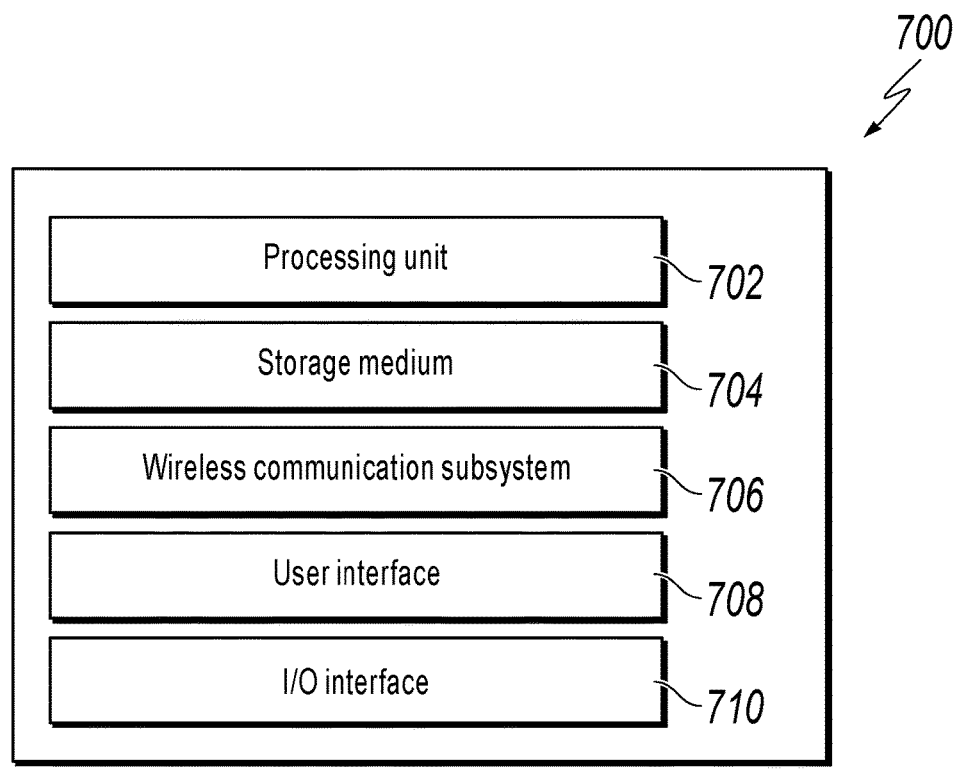
FIG. 7 is a block diagram illustrating an example mobile device according to an implementation.

FIG. 7 is a block diagram illustrating an example mobile device 700 according to an implementation. The example mobile device 700 can be used to run applications for the cargo shipping system, e.g., the cargo tracking device, the sensors, and the client application, described previously. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The illustrated device 700 includes a processing unit 702, a computer-readable storage medium 704 (for example, read-only memory (ROM) or flash memory), a wireless communication subsystem 706, a user interface 708, and an I/O interface 710.

The processing unit 702 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 702 may be configured to generate control information, such as a measurement report, or to respond to received information, such as control information from a network node. The processing unit 702 may also be configured to make a Radio Resource Management (RRM) decision such as cell selection/reselection information, or trigger a measurement report. The processing unit 702 can also include other auxiliary components, such as random access memory (RAM) and ROM.

The computer-readable storage medium 704 can store an operating system (OS) of the device 700 and various other computer-executable instructions, logic or software programs for performing one or more of the processes, steps, or actions described above. In some cases, the computer-readable storage medium 704 can be transitory, non-transitory, or a combination thereof.

The wireless communication subsystem 706 may be configured to provide wireless communication for voice, data, and/or control information provided by the processing unit 702. The wireless communication subsystem 706 can include, for example, one or more antennas, a receiver, a transmitter, a local oscillator, a mixer, and a DSP unit. In some implementations, the subsystem 706 can support MIMO transmissions. In some implementations, the receiver in the wireless communication subsystems 706 can be an advanced receiver or a baseline receiver. Two receivers can be implemented with identical, similar, or different receiver processing algorithms.

The user interface 708 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 710 can include, for example, a universal serial bus (USB) interface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD \, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n/ac/ad/af/ah/aj/ax and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method for pairing a tracking device with a sensor, comprising:
receiving, at the sensor and from the tracking device, an authentication request message, wherein the tracking device is configured to obtain and send information of a location status of a transportation unit coupled with the tracking device, the authentication request message comprising:
a first encrypted value, wherein the first encrypted value comprises a concatenation value that is encrypted using a first encryption key, wherein the concatenation value is a concatenation of a static public key of the tracking device and an ephemeral public key of the tracking device, wherein the first encryption key is generated by using a static public key of the sensor as an input parameter to a predetermined key derivation function; and
a second encryption key, wherein the second encryption key is generated by using the first encryption key as an input parameter to the predetermined key derivation function;
in response to the authentication request message, sending, from the sensor to the tracking device, an authentication response message; and
receiving, at the sensor and from the tracking device, an authentication confirmation message.

2. The method of claim 1, wherein:
the authentication response message comprises a second encrypted value, wherein the second encrypted value comprises a second concatenation value that is encrypted using a session key, wherein the second concatenation value is a concatenation of a first confirmation text and a cryptographic nonce;
the authentication confirmation message comprises a third encrypted value, wherein the third encrypted value comprises a concatenation of a second confirmation text and the cryptographic nonce that is encrypted using the session key; and
a fourth encrypted value is stored at the sensor prior to receiving the authentication request message, the fourth encrypted value comprises a concatenation of the static public key of the sensor and a static private key of the sensor that is encrypted using the second encryption key.

3. The method of claim 2, further comprising:
prior to sending the authentication response message to the tracking device:
obtaining, by the sensor, the static public key of the sensor from the fourth encrypted value using the second encryption key received from the tracking device;
computing, by the sensor, the first encryption key using the static public key of the sensor;
obtaining, by the sensor, the static public key of the tracking device and the ephemeral public key of the tracking device from the first encrypted value in the authentication request message using the computed first encryption key; and
validating, by the sensor, the static public key of the tracking device and the ephemeral public key of the tracking device.

4. The method of claim 2, wherein the static public key of the sensor and the static private key of the sensor are removed from the sensor after the fourth encrypted value is stored at the sensor.

5. The method of claim 2, wherein the session key is generated by the sensor based at least in part on an ephemeral public key of the sensor and an ephemeral private key of the sensor.

6. The method of claim 1, wherein the static public key of the tracking device in the first encrypted value is included in a mini-certificate.

7. The method of claim 1, wherein the authentication request message, the authentication response message, and the authentication confirmation message are generated using Advanced Encryption Standard with Galois/Counter Mode (AES-GCM).

8. The method of claim 1, wherein the tracking device is further configured to obtain load status indicating whether the transportation unit is full, empty, or partially full.

9. The method of claim 1, wherein the transportation unit is an unpowered vehicle, a freight container, or any other reusable transport unit that can be used to transport cargo loads between different locations.

10. The method of claim 1, wherein the sensor includes one or more of:
a scanning sensor configured to scan an interior of the transportation unit;
a weighting sensor configured to detect a current weight of the transportation unit;
a motion sensor configured to detect motion one or more doors of the transportation unit; and
a location sensor configured to receive global positioning system (GPS) signals associated with the location status of the transportation unit.

11. An electronic device, comprising:
a memory; and
at least one hardware processor communicatively coupled with the memory and configured to:
receive an authentication request message from a tracking device, wherein the tracking device is configured to obtain and send information of a location status of a transportation unit coupled with the tracking device, the authentication request message comprising:
a first encrypted value, wherein the first encrypted value comprises concatenation value that is encrypted using a first encryption key, wherein the concatenation value is a concatenation of a static public key of the tracking device and an ephemeral public key of the tracking device, wherein the first encryption key is generated by using a static public key of a sensor as an input parameter to a predetermined key derivation function; and
a second encryption key, wherein the second encryption key is generated by using the first encryption key as an input parameter to the predetermined key derivation function;
send an authentication response message to the tracking device; and
receive an authentication confirmation message from the tracking device.

12. The electronic device of claim 11, wherein:
the authentication response message comprises a second encrypted value, wherein the second encrypted value comprises a second concatenation value that is encrypted using a session key, wherein the second concatenation value is a concatenation of a first confirmation text and a cryptographic nonce;

the authentication confirmation message comprises a third encrypted value, wherein the third encrypted value comprises a concatenation of a second confirmation text and the cryptographic nonce that is encrypted using the session key; and a fourth encrypted value is stored at the electronic device prior to receiving the authentication request message, the fourth encrypted value comprises a concatenation of the static public key of the electronic device and a static private key of the electronic device that is encrypted using the second encryption key.

13. The electronic device of claim 12, wherein the at least one hardware processor is configured to:

prior to sending the authentication response message to the tracking device:

obtain the static public key of the electronic device from the fourth encrypted value using the second encryption key received from the tracking device;

compute the first encryption key using the static public key of the electronic device;

obtain the static public key of the tracking device and the ephemeral public key of the tracking device from the first encrypted value in the authentication request message using the computed first encryption key; and validate the static public key of the tracking device and the ephemeral public key of the tracking device.

14. The electronic device of claim 12, wherein the static public key of the electronic device and the static private key of the electronic device are removed from the electronic device after the fourth encrypted value is stored at the electronic device.

15. The electronic device of claim 12, wherein the session key is generated by the electronic device based at least in part on an ephemeral public key of the electronic device and an ephemeral private key of the electronic device.

16. The electronic device of claim 11, wherein the static public key of the tracking device in the first encrypted value is included in a mini-certificate.

17. The electronic device of claim 11, wherein the authentication request message, the authentication response message, and the authentication confirmation message are generated using Advanced Encryption Standard with Galois/Counter Mode (AES-GCM).

18. A non-transitory computer-readable medium containing instructions which, when executed, cause a computing device to perform operations comprising:

receiving, at the computing device and from a tracking device, an authentication request message, wherein the tracking device is configured to obtain and send information of a location status of a transportation unit coupled with the tracking device, the authentication request message comprises:

a first encrypted value, wherein the first encrypted value comprises a concatenation value that is encrypted using a first encryption key, wherein the concatenation value is a concatenation of a static public key of the tracking device and an ephemeral public key of the tracking device, wherein the first encryption key is generated by using a static public key of a sensor as an input parameter to a predetermined key derivation function; and a second encryption key, wherein the second encryption key is generated by using the first encryption key as an input parameter to the predetermined key derivation function;

in response to the authentication request message, sending, from the computing device to the tracking device, an authentication response message; and receiving, at the computing device and from the tracking device, an authentication confirmation message.

19. The non-transitory computer-readable medium of claim 18, wherein:

the authentication response message comprises a second encrypted value, wherein the second encrypted value comprises a second concatenation value that is encrypted using a session key, wherein the second concatenation value is a concatenation of a first confirmation text and a cryptographic nonce;

the authentication confirmation message comprises a third encrypted value, wherein the third encrypted value comprises a concatenation of a second confirmation text and the cryptographic nonce that is encrypted using the session key; and a fourth encrypted value is stored at the computing device prior to receiving the authentication request message, the fourth encrypted value comprises a concatenation of the static public key of the computing device and a static private key of the computing device that is encrypted using the second encryption key.

20. The non-transitory computer-readable medium of claim 19, the operations further comprising:

prior to sending the authentication response message to the tracking device:

obtaining, by the computing device, the static public key of the computing device from the fourth encrypted value using the second encryption key received from the tracking device;

computing, by the computing device, the first encryption key using the static public key of the computing device;

obtaining, by the computing device, the static public key of the tracking device and the ephemeral public key of the tracking device from the first encrypted value in the authentication request message using the computed first encryption key; and validating, by the computing device, the static public key of the tracking device and the ephemeral public key of the tracking device.

21. The non-transitory computer-readable medium of claim 19, wherein the static public key of the computing device and the static private key of the computing device are removed from the computing device after the fourth encrypted value is stored at the computing device.

22. The non-transitory computer-readable medium of claim 19, wherein the session key is generated by the computing device based at least in part on an ephemeral public key of the computing device and an ephemeral private key of the computing device.

23. The non-transitory computer-readable medium of claim 18, wherein the static public key of the tracking device in the first encrypted value is included in a mini-certificate.

* * * * *